Patented May 10, 1932

1,857,691

UNITED STATES PATENT OFFICE

ISADORE SIDNEY MELLANOFF, OF PHILADELPHIA, PENNSYLVANIA, ASSIGNOR TO KEMIKAL, INC., A CORPORATION OF DELAWARE

SHELLAC SUBSTITUTES

No Drawing.   Application filed May 20, 1929.   Serial No. 364,698.

The present invention relates particularly to a shellac substitute which is especially useful for use as a size, binder, coating material or as a backing for paper, textiles, fabrics or other materials. The material is made by stopping the condensation process of phenol and formaldehyde which takes place in the presence of a material acting as a catalyst or reagent at such a point that the condensation product is a substantially transparent material which on cooling to ordinary temperatures remains somewhat liquid and the term "condensation product" is employed in the appended claims with such meaning. As examples of such material any of the condensation products described in my application for Patent Ser. No. 290,267 filed July 3, 1928 Patent No. 1,804,379 may be employed, it being understood that the end product is not used but the intermediate product obtained by stopping the process when the material is substantially transparent and more or less liquid when cooled to ordinary temperatures. When desired there may be added organic or inorganic fillers such as talc, clays, pigments, fibrous materials etc. although of course the addition of these materials will interfere with the transparency of the material.

The shellac substitute of the present invention is produced by mixing at ordinary temperatures the liquid transparent condensation product with a solution of casein. There is an advantage in adding the casein solution gradually or a little at a time to the liquid condensation product. Preferably the material is stirred more or less constantly during the process so that an even distribution and intermingling of the materials is produced. If large quantities or an excess of casein is added there may be caused coagulation resulting in a settlement or depositing of material in the bottom of the vessel. When this happens the addition of a small quantity of ammonium hydroxid or other solvent of casein will generally cause the coagulated matter to return to solution. It is frequently desirable to introduce early in the operation a small quantity of ammonium hydroxid or other solvent of casein which will have the tendency to avoid the coagulation and allow more flexibility in manipulation. There may be produced a more satisfactory product if in the batch there is introduced a small amount of sulphonated castor oil. This seems to act not only as a lubricant for the stirring and intermingling of the mass but also has an effect in the resulting product which may resemble an emulsion. When sulphonated castor oil is employed in the mass the material when finally applied as a coating or size etc. is softer smoother and more flexible than when the castor oil is omitted. When the product is to be employed in a place where a high polish is desirable a small quantity of wax may be added to aid in this respect. Likewise an improved soft flexible product may be produced if there is added a small quantity of commercial animal glue to the casein solution before it is added to the transparent condensation product. Although the final result is useful when glue is used the handling of the mixture is more difficult. The presence of the glue in the batch seems to cause a greater tendency to precipitation or coagulation.

When no filler or coloring material is added the product may be opaque like an emulsion and more or less white or of a very light yellow color depending upon whether the condensation product employed has a strong color or is almost colorless. This in turn will generally depend upon the character of the phenol employed. When a white or substantially colorless phenol is employed the condensation product may have a very light yellow color which when used for making the material of the present invention into which the sulphonated castor oil is introduced will produce a substantially white fluid having the appearance of an emulsion. When, however, cruder phenols are employed a deeper yellow may be produced in the transparent condensation product which in turn will produce yellowish or darker emulsions by the present invention. The introduction of ammonium hydroxid generally has the tendency to produce in the product a more or less pronounced yellow color even when a condensation product very light in color has been employed.

The material produced by the present invention forms a desirable and satisfactory water-proof coating for papers, as well as other textiles and fabrics.

Without limiting the invention thereto but as one specific example of appropriate procedure it will be found that a satisfactory material for such use may be produced by making a solution of 100 parts by weight of casein in 400 to 800 parts by weight of water in which has been dissolved about 16 parts by weight of borax to aid in dissolving the casein. To this may be added about 10 parts by weight of 26% ammonium hydroxid. Of this casein solution about 4 parts by weight may be added to about 5 parts by weight of transparent liquid resin being the transparent liquid condensation product above indicated having a specific gravity of about 1.2 together with about 1 part by weight of sulphonated castor oil, and about 1 part by weight of 10% ammonium hydroxid. These ingredients may be brought together by placing the 5 parts by weight of the condensation product in a suitable vessel and maintaining it at the ordinary room temperature. Into this may be gradually poured about 4 parts by weight of the casein solution made as above described, the mass being stirred and kept in agitation to thoroughly mix. The casein solution preferably, however, will be added in small portions, say ¼ or ⅕ at a time, with vigorous stirring as each portion is added to insure even distribution. If it is seen that too much casein has been added so that coagulation takes place the 1 part by weight of sulphonated castor oil may be added and if so desired the 1 part by weight of 10% ammonium hydroxid. Stirring will cause the coagulation to disappear. Of course the castor oil and ammonium hydroxid may be added to the resin before any of the casein solution is introduced and in some cases this may be preferable since it may insure a continuously smoother operation.

The transparent resinous condensation product referred to above alone and without treatment may be applied to paper and other fabrics. It, however, generally does not remain on the surface but is absorbed by the fabric. As a result of such treatment considerable quantities of the resin are needed and there is a stiffening and possibly a change in the fabric itself. When, however, to the transparent resinous material is added casein as indicated above there is produced a material which generally is not absorbed to any great extent by the paper or other fabric but is merely deposited upon the surface of the fabric to which it adheres tenaciously. Why this effect takes place is not certainly established but it may be because the casein is in the so-called colloidal form. The transparent resin alone is more or less inelastic and brittle and even when associated with the casein a brittle coating may be produced which is limited in its usefulness because it may be readily or easily cracked and injured in handling or manipulation. When, however, the sulphonated castor oil is added in about the quantity indicated above there is produced a flexible coating which may be manipulated and handled without injury or may even lend itself to embossing. When desired a smooth, highly polished surface may be obtained by passing the coated fabric through heated calender rolls in the well known manner. When this is done and it is desired to produce a specially high gloss there may be added to the coating material a small amount of wax as indicated above. The coated material may be crumpled to craze the coating and then passed through the calender rolls to produce an appearance of leather.

While the mass will generally be somewhat opaque and have the general cloudy appearance of an emulsion yet the thin layer placed on the surface of the material to be coated may be nearly colorless and substantially transparent and will allow the inherent color of the underlying material to show through and give a colored appearance to the surface. Of course the apparent color will depend on the color of the material to be coated. The invention is not limited to the precise conditions and quantities which are herein set forth as illustrative only. The proportions of the ingredients may be varied and the mode of application or compounding may depend on the results sought. Modifications of the above specific example will suggest themselves without departing from the teaching of the present specification.

I claim as my invention:

1. The process of producing a shellac substitute comprising making a solution of about 100 parts of casein in about 400 to 800 parts of water containing about 16 parts of borax and about 10 parts of 26% ammonium hydroxid and then slowly adding about 4 parts of the casein solution to about 5 parts of a condensation product made by stopping the condensation process of phenol and formaldehyde which takes place in the presence of a material acting as a catalyst or reagent at such a point that the condensation product is a substantially transparent material which on cooling to ordinary temperatures remains somewhat liquid while stirring.

2. The process of producing a shellac substitute comprising making a solution of about 100 parts of casein in about 400 to 800 parts of water containing about 16 parts of borax and about 10 parts of 26% ammonium hydroxid and then slowly adding about 4 parts of the casein solution to about 5 parts of a condensation product made by stopping the condensation process of phenol and formaldehyde which takes place in the presence of a material acting as a catalyst or reagent at such a point that the condensation product is a substantially transparent material which on cooling to ordinary temperatures remains somewhat liquid to which is added about 1 part of sulphonated castor oil and keeping the batch agitated to thoroughly mix.

ISADORE SIDNEY MELLANOFF.